Figure 1:
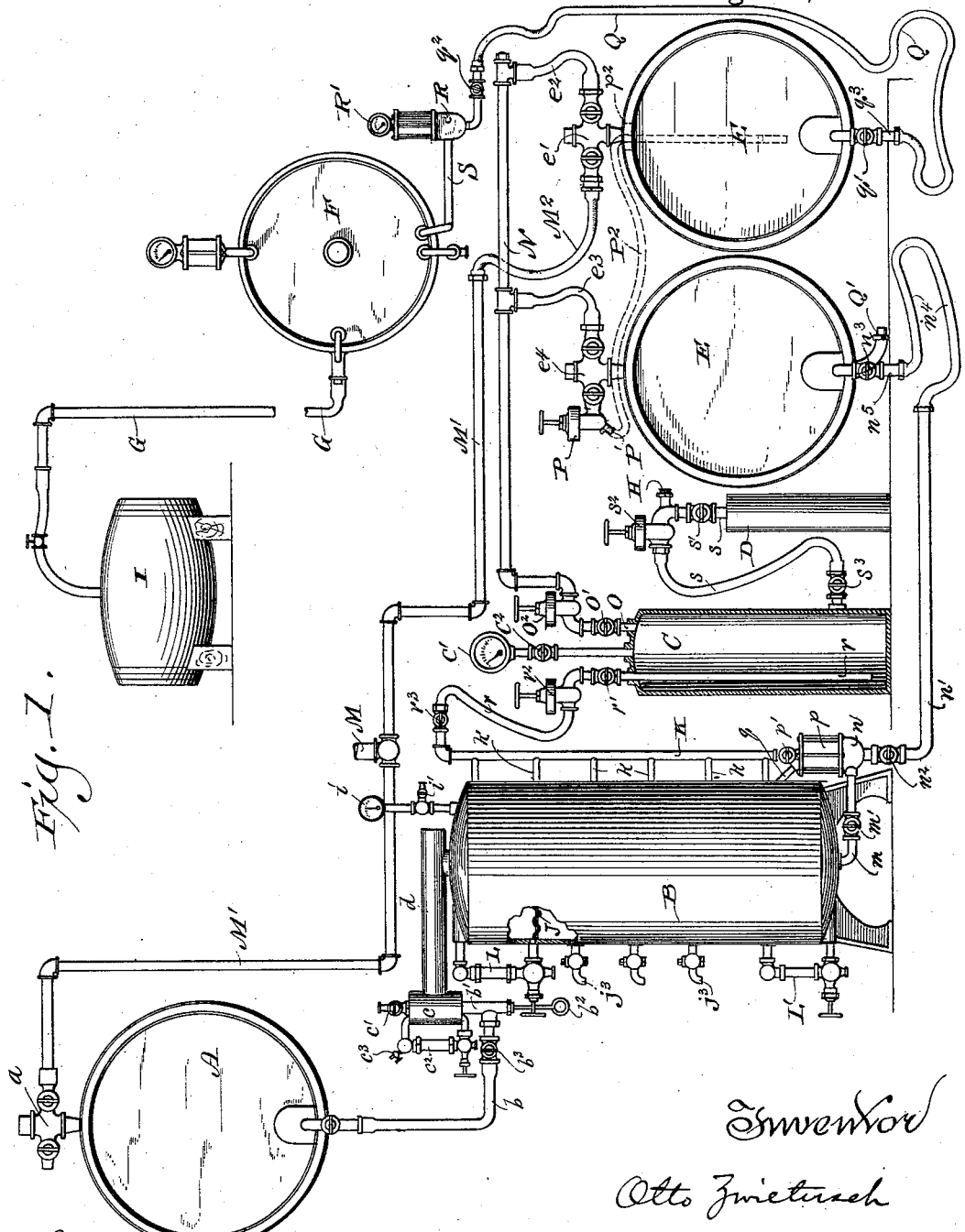

(No Model.) 2 Sheets—Sheet 1.

O. ZWIETUSCH.
METHOD OF AND APPARATUS FOR TREATING BEER.

No. 589,065. Patented Aug. 31, 1897.

Witnesses.
Geo. W. Young
Jno. U. Snurnberger

Inventor
Otto Zwietusch
By H. G. Underwood
Attorney

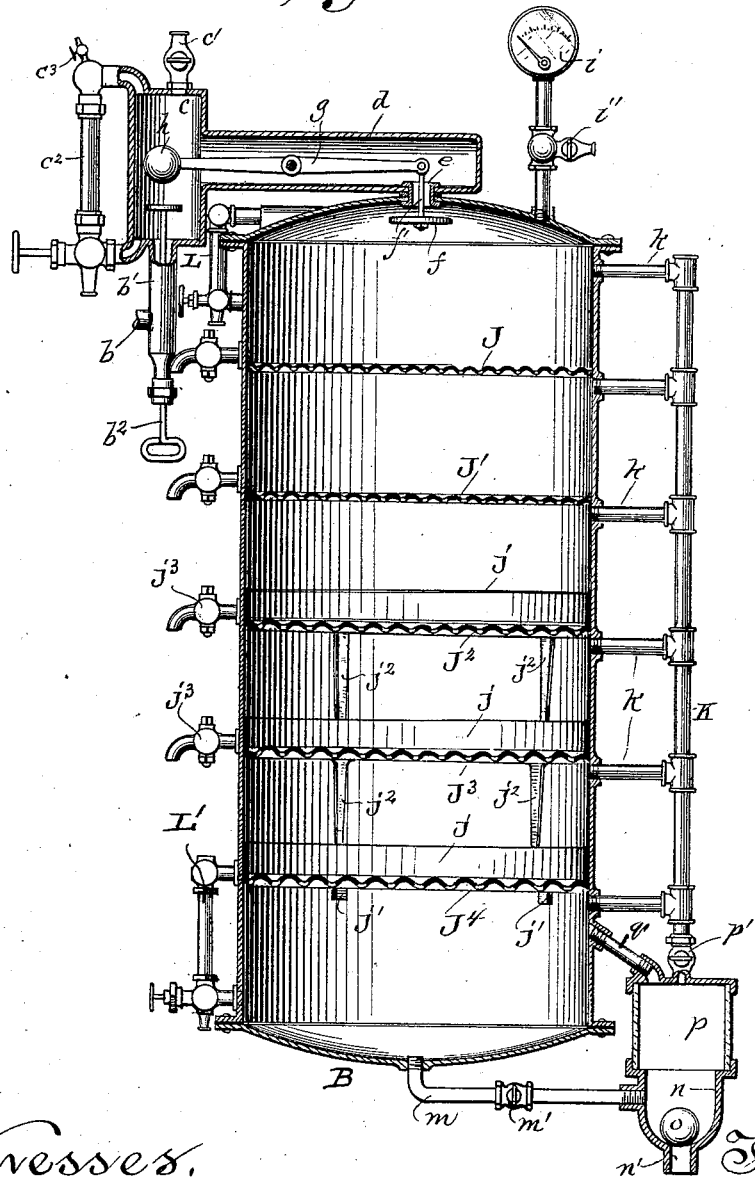

UNITED STATES PATENT OFFICE.

OTTO ZWIETUSCH, OF MILWAUKEE, WISCONSIN.

METHOD OF AND APPARATUS FOR TREATING BEER.

SPECIFICATION forming part of Letters Patent No. 589,065, dated August 31, 1897.

Application filed February 11, 1893. Serial No. 461,921. (No model.)

*To all whom it may concern:*

Be it known that I, OTTO ZWIETUSCH, a citizen of the United States, and a resident of Milwaukee, in the county of Milwaukee, and in the State of Wisconsin, have invented certain new and useful Improvements in Methods of and Apparatus for the Treatment of Beer and other Malt Liquids; and I do hereby declare that the following is a full, clear, and exact description thereof.

My invention relates to the treatment and finishing of beer and other malt liquids, and especially the impregnation thereof with carbonic-acid gas; and it consists in a new and useful method or art of accomplishing these results, as well as in the novel and useful apparatus therefor, all as will be fully set forth hereinafter and subsequently claimed.

In the drawings, Figure 1 is a general view of my improved apparatus, the several parts thereof being arranged in proper relative positions for the carrying out of my present method. Fig. 2 is a central vertical sectional view of the carbonator shown in the preceding figure and forming a part of my novel apparatus.

The general object of this present invention is much the same as that set forth in the prior patent granted to me November 1, 1892, and numbered 485,362, but the principal difference between the invention set forth in my said prior patent and that forming the subject of this present application lies in the fact that in the former case the beer or other liquid is carbonated in the cask and held therein for a resting period, so as to allow albuminoids to coagulate, such coagulation being caused by carbonating, while in my present invention the liquid is carried from the ruh or resting cask or casks to another cask or series of casks for resting, if desired, and is carbonated while on its way from the first to the second cask or series of casks by passing it (preferably in a spray or rain-like manner) through a column of carbonic-acid gas under a certain pressure and thence directly from said second cask (or from any of the series of casks, as preferred) to and through the filter and into the final receptacles.

In the accompanying drawings, A represents the first ruh or resting cask; B, the carbonator; C, a cylinder constituting the carbonic-acid-gas reservoir; D, a cylinder constituting the carbonic-acid-gas supply; E E, the second ruh or resting casks; F, the filter, and G the filling-pipe, leading from the filter to the barrels or casks I that are to contain the finished beer.

The carbonator B (best shown in detail in Fig. 2) consists of a cylinder or vessel provided with a series of perforated and preferably corrugated disks J J' $J^2$ $J^3$ $J^4$, arranged one above the other and each of such outline as to fit snugly within the said vessel. The upper disk is provided with the smallest perforations, so as to retard the flow of beer at this point and enable its height to be observed through the fluid-gage L. In the illustration given I have shown several forms of these disks, the upper two, J J', being simply corrugated and perforated plates fitted tightly to place within the said carbonator, while disks $J^2$, $J^3$, and $J^4$ are shown as provided with upwardly-extending circumferential or edge flanges $j\ j\ j$. The lower disk $J^4$ rests upon lugs or projections $j'\ j'$, while the disks $J^2$ $J^3$ are provided with legs $j^2\ j^2$, which rest upon the upward flanges $j$ of the disks below them, as shown. Any of these styles of disks may be used in my carbonator as preferred. The object of the perforations in these disks is to distribute the beer in fine streams from each disk to the one below through a column of carbonic-acid gas.

The beer from the ruh-cask A enters the top of the carbonator B through the supply-pipe $b$, tube $b'$, and a vessel comprising a vertical chamber $c$ and horizontal chamber $d$ and then through inlet $e$. Beneath this inlet is a valve $f$, connected by stem $f'$ with one end of a lever $g$, pivoted within the horizontal chamber $d$, and whose other end carries a floating ball $h$ within the vertical chamber $c$. When beer is flowing into the carbonator, this ball will rise and keep the inlet $e$ open, but when there is no liquid within said vessel $c\ d$ the ball $h$ will drop, and thus raise the valve $f$ up against the inlet $e$, closing the latter.

$b^2$ is a stem to raise the float-ball $h$ when desired.

$c'$ is an air-escape cock on top of the chamber $c$ of the described vessel, which chamber is provided with a water-gage $c^2$ (having air-escape cock $c^3$) to indicate the height of the liquid in said vessel.

The supply-pipe $b$ has a suitable cock $b^3$.

On top of the carbonator B is a pressure-gage $i$, with an air-escape cock $i'$ below it.

L is a water-gage in the upper part of the carbonator B, and L' is a like gage in the lower part of the same to enable one to observe the height of the collected beer above the upper disk and also in the lower part of the carbonator, and also to regulate the flow of the beer and the supply of the carbonic-acid gas accordingly.

Above each disk in the carbonator is a try-cock $j^3$, and $m$ is the outlet from the bottom of the carbonator, provided with a cock $m'$ and leading to a valve-chamber $n$, provided with a loose ball-valve $o$. Above this and communicating with this chamber $n$ is a transparent chamber $p$, having a pipe $q$ leading into the lower part of the carbonator, or, if preferred, having a passage (controlled by cock $p'$) communicating with the vertical gas-supply pipe K, from which latter branches $k k$ enter the carbonator, one under each disk, while from the lower side of the chamber $n$ there leads an outflow-pipe $n'$, having stop or controlling cock $n^2$ and flexible continuation $n^4$.

The carbonic-acid-gas reservoir or cylinder C is provided with a pressure-gage $C'$ and an air-escape cock $C^2$, and from near its base there extends a pipe $r$, passing upward and out of the cylinder C and fitted with a cock $r'$ and pressure-regulator $r^2$, beyond which said pipe $r$ continues and is connected to the upper part of the described carbonic-acid-gas-supply pipe K, having a suitable stop or controlling cock $r^3$ adjacent to this point of connection.

From the carbonic-acid-gas-supply cylinder D there passes a pipe $s$, having a suitable cock $s'$ and a pressure-regulator $s^2$, beyond which said pipe $s$ continues and enters the just-described cylinder C, said pipe having a suitable cock $s^3$ adjacent to this point. At any convenient point on this pipe $s$ (as, for instance, just above the cock $s'$) a connection may be made with another pipe H, leading from a carbonic-acid-gas-storage cylinder—such, for instance, as is described and shown in my Patent No. 518,361, dated April 17, 1894.

M represents a pipe leading from a source of air under pressure, (not shown,) and M' the air-supply pipe communicating with pipe M and branching in different directions, one branch leading to the ruh-cask A and there provided with a cross-cock $a$, while the other branch of this pipe M' has a flexible termination $M^2$, shown here as leading to the right-hand one of the casks E, the latter being provided with a cross-cock $e'$ at this point. Beyond this cross-cock this cask E is connected by a flexible branch $e^2$ and pipe N with a pipe O, leading from the carbonic-acid-gas-reservoir cylinder C, (there being a suitable cock O' and pressure-regulator $O^2$ on said pipe O between the cylinder C and pipe N,) and another flexible branch $e^3$, leading from cross-cock $e^4$ on the other cask E, connects this last-named cask E with said pipe N and its connections. The just-described flexible-pipe termination $M^2$ is adapted to be connected to the cross-cock $e^4$ by uncoupling the just-described flexible branch $e^3$ when it is desired to fill this cask E with air instead of gas. This cross-cock $e^4$ is provided with an air-escape-regulating valve P, to be used while the casks E E are being filled with beer, and with a screw-threaded nipple P', on which may be attached a flexible hose $P^2$, (shown in dotted lines,) leading into the other cask E, through the open bung-hole thereof, (indicated at $p^2$ by dotted lines,) the said cask being empty. The object of this is to enable the carbonic-acid gas in the left-hand cask E to escape through this pipe $P^2$ into the empty right-hand cask E and drive out the air therefrom while the first (left hand) cask E is being filled with beer, the air escaping from the open bung-hole $p^2$, through which the said pipe $P^2$ (of less diameter than the bung-hole) passes. The flexible termination $n^4$ of the pipe $n'$ is shown in the drawings as connected to the pipe-section $n^5$, (having cock $n^3$,) leading from the first or left-hand cask E. As there may be any desired number of these casks E this flexible pipe $n^4$ is of proper length (or of suitable number of sections) to enable it to be coupled to any cask that is to be filled with beer—for instance, to the pipe-section $q^3$, (having cock $q'$,) leading from the right-hand cask E. (Shown in the drawings.) It will be further understood that when the first cask E has been filled with beer and another cask (say the right-hand cask E shown in the drawings) is to be likewise filled the parts P P' are uncoupled from the cross-cock $e^4$ and coupled to the cross-cock, as $e'$, of the cask to be filled with beer after said last-named cask has been filled with the requisite counter-pressure of air or gas. These casks E E are so arranged, as will be readily understood from the foregoing, taken in connection with the drawings, that by reason of their respective cross-cocks $e'$ $e^4$ they may either receive a supply of air under pressure through the pipes M M' and branches or a supply of carbonic-acid gas from the cylinder C through the pipe N and branches, this latter supply being regulated by the pressure-reducer $O^2$, a constant pressure of this gas being maintained while the beer is resting in said cask. After resting the proper length of time the beer is forced from the cask E through the flexible pipe Q (here shown as coupled to pipe-section $q^3$, but which is to be coupled to the corresponding emptying-pipe section of any of the casks E to be emptied, said pipe Q having a controlling-cock $q^2$) and through a valve-chamber R, (just like the already-described transparent valve-chamber $n$ $p$ and having a similar float-ball inside,)

having a pressure-gage R' on top, and from this valve-chamber the beer goes through pipe S into filter F and from thence through the described filling-pipe G and its branches to the casks I that are to contain the finished beer.

The beer can be supplied directly from the ruh or any other cask. If the cask be elevated high enough to produce a pressure of about ten to twelve pounds in the carbonator, it is sufficient. If not, the usual air-pressure is applied through the pipes M M' described. The carbonic-acid gas is led into the carbonator through the pressure-regulator $r^2$ from the gas-reservoir C. The pressure-supply of gas must be the same or very nearly the same as the pressure of the beer-supply, so that on the entry of the latter at the top of the carbonator the beer which accumulates in the lower part is forced out of the carbonator into the other casks E E without permitting the gas to pass the outlet. In brief the beer enters the carbonator at the top, passing in a spray or shower through the gas column, is collected at the bottom, and is driven into other casks provided with a suitable counter-pressure. This latter pressure (in the casks E E) is less than that in the carbonator—for instance, seven or eight pounds in the casks to, say, about twelve pounds in the latter, this being a pressure sufficient to keep the carbonic-acid gas in the beer, but low enough to allow the beer to flow into the said casks. The supply of gas and beer must be so regulated that there will always be a sufficient body of both in the carbonator, but not to reach so high a pressure as to force all of the beer from the bottom, nor to permit the said gas to pass out of the outlet. By means of this method it is not necessary to employ only an old or aged beer, as the beer has time to rest and settle after carbonation. This is attained a great deal faster after being carbonated by holding it under a constant pressure. The beer passing into the carbonator has a compelling-pressure of, say, twelve pounds; but as it contains no carbonic-acid gas it will by passing through the gas column in fine streams become impregnated to a like pressure.

In place of taking ruh-beer I may employ beer which has been aged by the so-called "vacuum" process or by a process of filtration after the main fermentation and treat it just as described hereinbefore.

I obtain excellent results by collecting the carbonic-acid gas produced by fermentation in a brewery (and which is commonly a waste product in most breweries) and utilizing the same in the manner hereinbefore described, as the gas thus saved, taken from the main fermentation, is mostly pure or clear and is richly impregnated with flavors, especially hop aroma, which is maintained when the gas is carried into the beer being carbonated. This carbonic-acid gas is collected in any suitable receptacle, the outlet of which is connected to the pipe H, (shown in Fig. 1,) and then the cock $s'$ in the pipe $s$ above the cylinder D being closed and the cock $s^3$ in said pipe $s$ being opened this aroma-impregnated gas is forced into the gas reservoir or cylinder C at any pressure desired, this being regulated by the pressure-reducer $s^2$, already described.

When starting the carbonating, the carbonator has to be filled with carbonic-acid gas, and the air in it is driven out by said gas in expelling the air from the upper air-cock, or the carbonator may be filled with water, which is also forced out by the pressure of the carbonic-acid gas. The supplying air-pressure on the delivery-casks and the counter-pressure in the receiving-casks must correspond in connection with the gas-supply of the carbonator.

It will be observed that I employ a float-ball-valve arrangement both at the outlet and the inlet of the carbonator. When the ruh-cask is above the plane of the inlet of the carbonators, as shown in the drawings in this case, then, on account of the action of gravity, I employ the lever form of ball-float valve, (illustrated in detail in Fig. 2,) but if the cask from whence the beer is taken for carbonating is in a relatively lower position than the inlet of the carbonator the air-pressure under these circumstances requires to be somewhat higher than the pressure of the gas in the carbonator, and hence I would in such case substitute at said inlet for the vessel $c\ d$ and lever-valve shown a free float-ball valve practically like the device $n\ o\ p$, (shown at the outlet of the carbonator,) which float-ball would then shut off the inlet as soon as the flow of the liquid from the said cask ceased, to prevent the escape of carbonic-acid gas through the said carbonator-inlet. Similarly when the flow of liquid from the carbonator ceases the lower ball-valve $o$ (shown in the drawings) operates to close the pipe $n'$, leading to the second ruh cask or casks E E, and thereby prevents the carbonic-acid gas in the carbonator from escaping through said pipe $n'$, the described pipe $q$ (or passage from $p$ to K) affording a means of equalizing the pressure of the gas in the carbonator B and valve-casing $n\ p$, so that when there is a fresh supply of liquid passing through the carbonator the ball $o$ will automatically rise, and the flow of liquid outward be resumed.

As a matter of comparative pressure it may be stated that my apparatus will be found to work very satisfactorily if there is a pressure of from five hundred to eight hundred pounds in the supply-cylinder D, reducing it to a lower pressure in reservoir C of from thirty to fifty pounds, which must be greater than the pressure in the carbonator, the latter being given (as a matter of illustration) as, say, twelve pounds, and the counter-pressure in the casks E E at from nine to ten pounds. The time of resting the beer in these casks E E depends entirely on the character of the beer. If it is a very old clear beer, almost free from yeast before the carbonating, it may be brought right from cask E through the filter in the ultimate vessels; but it is preferable to let it rest a little for losing the wild condition which occurs more or less during the carbonation.

If the beer is worked in a continued manner without being interrupted on its way from the ruh-cask through the carbonator, second or settling cask, the filter, and into the ultimate receptacles, then the compelling-pressure upon the ruh-cask must be high enough to produce a constant flow through the carbonator, settling-cask, and filter, so that the latter will be furnished with the proper counter-pressure to prevent the escape of carbonic-acid gas on its way or during filtration. The pressure of carbonic-acid gas for the carbonator must be furnished accordingly, and which must be a little higher than the gaseous pressure contained thereafter in the beer, and in working in this manner the pressure in the carbonator and second or settling cask has to be the same, sufficient to force the beer through the filter.

When old clear ruh-beer is to be carbonated, this sometimes does not require resting after leaving the carbonator, and in order to convey such beer directly to the filter F, I provide the first cask E with an additional outlet Q' in its lowest part, to which the flexible pipe Q, which leads to said filter, may be attached without disturbing the connection of the pipes $n^4$ $n^5$.

In the manufacture of beer as heretofore practiced after the wort has undergone the main fermentation it has been transferred to ruh or resting casks for proper aging, and thereafter to "chip-casks," so called, wherein it is prepared for the market by the introduction of a proper quantity of "kraeusen," or young beer, to excite a new fermentation and thus give the beer the requisite life and effervescence by the generation therein of carbonic-acid gas. Incidentally the beer is clarified in the chip-casks by means of shavings and isinglass, and usually during the past twelve years the general treatment in these casks has been aided by means of a bunging apparatus, either applied singly to each cask or connected to a series of casks, and within the past three or four years the final operation, with or without the complete clarifying operation in the chip-casks above referred to, has consisted usually of a process of filtration to which the beer is subjected while on its way from the chip-casks to the kegs, whereby special clearness and brilliancy are imparted to the beverage when ready for the market.

In my present invention, as in my patent No. 485,362, already referred to, I give the beer the required quantity of carbonic-acid gas, (without refermentation by the use of "kraeusen-beer," and chip-casks or "shavings-casks" containing, as is well-known, shavings of beech or other soft wood to aid the clarifying and settling,) this gas being derived from an extraneous source, and in this present case the carbonating is done in the continuous current flowing from the ruh-cask to the final point of discharge instead of in the body of the beer in casks, as heretofore practiced, whereby a great saving of time and material is effected. The use of shavings, kraeusen, and isinglass or finings not only involves considerable extra initial expense, but the proper preparation of the beer in the shavings-casks and during the described refermentation occasioned by the use of kraeusen and the subsequent settling and clarification incident to the use of the finings occupies from two to three weeks usually, whereas when all of this is dispensed with and the beer is carbonated on its way and while it is flowing from the first receptacle to a ruh or resting cask or series of casks during the process of manufacture, with gas from an extraneous source, (instead of by gas generated in the beer itself,) there is practically little or no delay, the beer being either conveyed directly to a ruh or resting cask or series of casks, from which it may be conveyed immediately to the final receptacle or be permitted to remain there without injury and be drawn therefrom at any time most convenient into said final receptacle, and this avoidance of the use of shavings-casks, kraeusen, and finings, and the consequent freedom from any refermentation and necessary subsequent clarification incident to the old process, produces a greatly superior and more palatable article, and this, together with the immense saving of time and expense by my direct process of carbonating the beer, as described, during its process of manufacture, constitute very vital and essential elements and advantages of my present method.

Having thus described my invention, what I claim as new, and desire to secure by Letters Patent, is—

1. The method of treating beer and other malt liquids within carbonic-acid gas, which consists in leading a current of said liquid from a suitable vessel through a carbonator, to a resting-cask, impregnating said liquid while it is thus flowing with carbonic-acid gas from an outside source under automatically-controlled pressure, keeping the liquid in said resting-cask under a certain pressure during the time necessary to produce coagulation, and then passing the said liquid through a filter and into the ultimate receptacle for the market.

2. The combination with a suitable closed vessel, having a liquid-inlet at its top and a liquid-outlet at its bottom, of a series of removable perforated disks, arranged one above another within said vessel, the latter being provided with a series of gas-inlets, arranged one beneath each of said perforated disks, and the inner ends of said inlets coming flush with the inner surface of the wall of said vessel, whereby said disks may fit tightly within said vessel, but be always freely removable therefrom and replaceable within the same.

3. The combination with a suitable closed vessel having a valve-controlled liquid-inlet at its top and a valve-controlled liquid-outlet at its bottom, of a series of corrugated and perforated disks, arranged one above another within said vessel, the latter being provided with a series of gas-inlets, arranged one beneath each of said perforated disks, fluid-gages located, respectively, at the upper and lower portions of said vessel, and a series of try-cocks arranged one above each of said perforated disks.

4. The combination with a suitable closed vessel having a liquid-inlet at its top and a liquid-outlet at its bottom, of a series of perforated disks extending, one above the other, across the entire inner space of said vessel, the perforations in the upper disk being smaller than those in the other disks, and said vessel having a series of gas-inlets arranged one beneath each of said disks.

5. The combination with a suitable closed vessel, having a liquid-inlet at its top and a liquid-outlet at its bottom, of a series of removable perforated and corrugated disks, each provided with a circumferential or edge upwardly-extending flange or rim, and adapted to fit closely within the interior of said vessel, and to rest on suitable supports within the same, said vessel having a series of gas-inlets arranged one beneath each of said disks, and the inner ends of said inlets coming flush with the inner surface of the wall of said vessel.

6. The combination with a suitable closed vessel, having a liquid-inlet and a liquid-outlet, of a series of perforated and corrugated disks, extending one above the other, across the entire inner space of said vessel, the perforations in the upper disk being smaller than those in the other disks and said vessel having a series of gas-inlets arranged one beneath each of said disks.

7. The combination with a suitable closed vessel having a valve-controlled liquid-inlet at its top, and a valve-controlled liquid-outlet at its bottom, a series of transverse inner perforated disks, a pressure-gage, an air-escape cock, fluid-gages at the upper and lower portions, respectively, of the vessel, the latter having a series of try-cocks arranged one above each of said perforated disks, and a series of gas-inlets arranged one beneath each of said disks.

8. In apparatus for the treatment of beer and other liquids, the combination with a closed vessel provided with suitable liquid-inlet and liquid-outlet, a series of perforated interior disks, and a series of gas-inlets, located one beneath each of said disks, of another closed vessel, comprising a vertical chamber and communicating horizontal chamber, the former having a liquid-inlet, and the latter having a liquid-outlet which coincides with the liquid-inlet of the first-named vessel, a lever pivoted centrally within the said horizontal chamber, and having a float-ball on one end which projects into said vertical chamber, and a valve-stem on its other end, said stem projecting through the outlet of the said horizontal chamber into the first-named vessel, and a valve on the lower end of said stem, within said vessel.

9. In apparatus for the treatment of beer and other liquids the combination with a ruh-cask and a carbonator of an interposed closed vessel, comprising a vertical chamber, and communicating horizontal chamber, the former having a liquid-inlet and valve-controlled pipe connecting the same with said ruh-cask, and the latter having a liquid-outlet communicating with the carbonator, a lever pivoted centrally within the said horizontal chamber, and having a float-ball on one end which projects into the said vertical chamber, and a valve-stem on its other end, projecting down into the carbonator, and there carrying a valve, the said carbonator having a suitable liquid-outlet and a suitable inlet or inlets for carbonic-acid gas.

10. In apparatus for the treatment of beer and other liquids, the combination of a ruh-cask, a carbonator having a series of perforated transverse inner disks, a carbonic-acid-gas reservoir, a valve and pressure-regulator-controlled pipe leading from the latter, a gas-supply pipe connected to the last-named pipe, branches leading from the gas-supply pipe to and into the carbonator, one beneath each disk, and suitable valve-controlled pipes, inlets, and outlets, leading to and from the several parts named.

11. In apparatus for the treatment of beer and other liquids, the combination of a ruh-cask, a carbonator having a series of perforated transverse inner disks, a carbonic-acid-gas-supply cylinder, a carbonic-acid-gas reservoir, a gas-supply pipe, valve and pressure-regulator-controlled pipes connecting the said cylinder and reservoir, and the said reservoir and gas-supply pipe, branches leading from the gas-supply pipe to and into the carbonator, one beneath each disk, and suitable valve-controlled pipes, inlets, and outlets, leading to and from the several parts named.

12. In apparatus for the treatment of beer and other liquids, the combination of a ruh-cask, a carbonator having transverse inner perforated disks, a carbonic-acid-gas reservoir, a carbonic-acid-gas-supply cylinder, and a second ruh-cask or series of casks, with interposed valve-controlled pipe connections, a gas-supply pipe connected to the reservoir and having branches leading into the carbonator, arranged one beneath each disk, pressure-regulators on the pipe connections between the cylinder and reservoir, and between the reservoir and gas-supply pipe, an airpressure-supply pipe and branches and cross-cock connections between said pipe and the several first and second ruh-casks.

13. In apparatus for the treatment of beer and other liquids, the combination with a ruh-cask, a carbonator, a carbonic-acid-gas reservoir, a gas-supply pipe connecting the reservoir and carbonator, a carbonic-acid-gas-supply cylinder, a second ruh-cask or series of casks, an air-pressure-supply pipe connected to the several ruh-casks, a filter, and a filling-pipe leading therefrom, and suitable valve-controlled pipe connections between the several parts.

OTTO ZWIETUSCH.

Witnesses:
H. G. UNDERWOOD,
C. W. SCOTT.